(12) United States Patent
Fedorova et al.

(10) Patent No.: US 7,487,317 B1
(45) Date of Patent: Feb. 3, 2009

(54) CACHE-AWARE SCHEDULING FOR A CHIP MULTITHREADING PROCESSOR

(75) Inventors: Alexandra Fedorova, Lincoln, MA (US); Christopher A. Small, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 251 days.

(21) Appl. No.: 11/265,956

(22) Filed: Nov. 3, 2005

(51) Int. Cl.
*G06F 12/08* (2006.01)
*G06F 9/46* (2006.01)

(52) U.S. Cl. .................... 711/168; 711/118; 711/130; 711/140; 711/169; 718/102

(58) Field of Classification Search ............ 711/130
See application file for complete search history.

(56) References Cited

U.S. PATENT DOCUMENTS

| | | | | |
|---|---|---|---|---|
| 5,835,705 A | * | 11/1998 | Larsen et al. ............... | 714/47 |
| 6,098,169 A | * | 8/2000 | Ranganathan ............... | 712/227 |
| 6,256,775 B1 | * | 7/2001 | Flynn .......................... | 717/127 |
| 6,332,178 B1 | * | 12/2001 | Dean et al. .................. | 711/118 |
| 6,748,558 B1 | * | 6/2004 | Gonzales et al. ............. | 714/47 |
| 6,954,922 B2 | * | 10/2005 | Liang .......................... | 717/130 |

OTHER PUBLICATIONS

Fedorova et al. "CASC: A Cache-Aware Scheduling Algorithm For Multithreaded Chip Multiprocessors", Sun Labs Technical Report TR 2005-0142, Apr. 2005, pp. 15.*
Berg, Erik and Hagersten, Erik; "Efficient Data- Locality Analysis of Long-Running Applications", from Department of Information Technology, Uppsala University, Uppsala, Sweden, Technical Report 2003-021, May 2004, 16 pages.
Snavely, Allan and Tullsen, Dean M.; "Symbiotic Jobscheduling for a Simultaneous multithreading Processor", published in the Proceedings of ASPLOS IX, Nov. 2000, 11 pages.
Denning, Peter J.; "Thrashing; Its Causes and Prevention", from PROC. AFIPS 1968 Fall Joint Computer Conference, 1968, 8 pages.
Parekh, Sujay, Eggers, Susan, Levy, Henry, Lo, Jack; "Threaded-Sensitive Scheduling for SMT Processors", http://www.cs.washington.edu/research/smt/, Apr. 2, 2000; 18 pages.

* cited by examiner

*Primary Examiner*—Hyung S Sough
*Assistant Examiner*—Kaushikkumar Patel
(74) *Attorney, Agent, or Firm*—Osha·Liang LLP

(57) ABSTRACT

A chip multithreading processor schedules and assigns threads to its processing cores dependent on estimated miss rates in a shared cache memory of the threads. A cache miss rate of a thread is estimated by measuring cache miss rates of one or more groups of executing threads, where at least one of the groups includes the thread of interest. Using a determined estimated cache miss rate of the thread, the thread is scheduled with other threads to achieve a relatively low cache miss rate in the shared cache memory.

12 Claims, 12 Drawing Sheets

CACHE-AWARE SCHEDULING FOR A CHIP MULTITHREADING PROCESSOR

BACKGROUND

In a typical computer network, a server computer 10 services requests from and provides data to client computers 12, 14, 16, 18 that are connected to the server computer 10 over a network (e.g., the Internet) 20. The server computer 10 may be used to store data, programs, etc. for use by the client computers 12, 14, 16, 18. Those skilled in the art will recognize that the server computers 10 may also be used to manage and control the client computers 12, 14, 16, 18.

In one example, an internet-based business may operate a server (or servers) to handle customer requests initiated at computer terminals located potentially thousands of miles away from the business's server(s). Each time a customer accesses the website of the business, an independent set of software instructions, i.e., a "thread," is executed by a processor of the business's server(s) to provide requested data to the customer.

In order to better meet increased networking demands, the "server" side of the client-server model shown in FIG. 1 may be implemented using any one of a variety of designs. For example, in FIG. 2, a server side of a computer network is implemented using server 30, 32 that each having a single processor 34, 36, respectively. Each single processor 34, 36 is capable of executing one thread at a time. Thus, the server side in FIG. 2 is capable of executing two threads at a time for the client computers 38, 40, 42, 44 connected to the servers 30, 32 over network 46. If a third thread is initiated while each of the processors 34, 36 is executing a thread, one of the threads being executed by the processors 34, 36 may be blocked in order to allow the third thread to be executed (dependent on, for example, priority of the third thread). Alternatively, the third thread may be forced to wait until one of the processors 34, 36 completes executing its respective thread.

In another type of design, for example, as shown in FIG. 3, a server side of a computer network is implemented using a server 50 that has a multithreaded processor 52. The multithreaded processor 52 is capable of executing a plurality of threads. Thus, if the multithreaded processor 52 supports the execution of x threads at a time, x threads may be executed at a time for the client computers 54, 56, 58, 60 connected to the server 50 over network 62. When a thread being executed by the multithreaded processor 52 stalls due to, for example, waiting for data from memory, another thread may be picked up and executed by the multithreaded processor 52.

In another type of design, for example, as shown in FIG. 4, a server side of a computer network is implemented using a multiprocessor server 70. The multiprocessor server 70 has a plurality of processors 72, 74, 76, 78 that are each capable of executing one thread at a time. Thus, in FIG. 4, the multiprocessor server 70 is capable of executing four threads in parallel for the client computers 80, 82, 84, 86 connected to the multiprocessor server 70 over network 88. Those skilled in the art will recognize that a symmetric multiprocessing (SMP) system is a type of multiprocessing system in which multiple threads may be executed in parallel. Although typical SMP processors only process one thread at a time, the greater number of processors in the SMP system relative to that of a non-multiprocessing system increases the number of threads that are executable in a given period of time.

In another type of design, for example, as shown in FIG. 5, a server side of a computer network is implemented using a multiprocessor server 90 that has a plurality of multithreaded processors 92, 94, 96, 98. Thus, if each of the multithreaded processors 92, 94, 96, 98 is capable of executing x threads at a time, the multiprocessor server 90 is capable of executing 4x threads at a given time for the client computers 100, 102, 104, 106 connected to the multiprocessor server 90 over network 108.

The execution of a software thread in any one of the types of processors described above with reference to FIGS. 2-5 occurs in a part of the processor known as the "core" (referred to and known in the art as "processing core"). The processing core is formed of a hardware execution pipeline and functional units (e.g., arithmetic units and load/store units) that actually perform the execution of a software thread.

In the case of a multithreaded processor as described above with reference to FIGS. 3 and 5, a scheduler, typically part of the operating system, selectively assigns multiple threads to a processing core of the multithreaded processor. Such a multithreaded processing core interleaves execution of instructions from multiple threads, potentially switching between contexts (i.e., switching between threads) on each cycle. A thread may become blocked when the thread encounters a long-latency operation, such as, for example, servicing a cache memory miss. When one or more threads are unavailable, the multithreaded processing core continues to switch among the remaining available threads. Those skilled in the art will recognize that for multithreaded workloads, such multithreading improves processor utilization and hides the latency of long operations.

SUMMARY

According to one aspect of one or more embodiments of the present invention, a method of performing computer system operations comprises: if an estimated shared cache miss rate of a first thread for scheduling in a chip multithreading processor is unknown, concurrently executing the first thread with at least one other thread; measuring a shared cache miss rate of the concurrently executing; and determining the estimated shared cache miss rate of the first thread dependent on the measuring.

According to another aspect of one or more embodiments of the present invention, an apparatus comprises: a plurality of processing cores, each capable of concurrently processing multiple threads; and a cache memory shared by the plurality of processing cores, where a first thread is assigned to one of the plurality of processing cores dependent on an estimated miss rate in the cache memory of the first thread.

According to another aspect of one or more embodiments of the present invention, a computer system comprises: an integrated circuit having a plurality of processing cores formed therein; a cache memory shared by the plurality of processing cores; and memory having instructions for assigning a first of a plurality of threads to one of the plurality of processing cores, where the instructions comprise instructions to (i) if an estimated miss rate in the cache memory of the first thread is unknown, concurrently execute the first thread with at least one other of the plurality of threads, (ii) measure a miss rate in the cache memory of the concurrently executing first thread and the at least one other thread, and (iii) determine the estimated miss rate of the first thread dependent on the instructions to measure.

Other aspects and advantages of the invention will be apparent from the following description and the appended claims.

DETAILED DESCRIPTION

Figure 1:
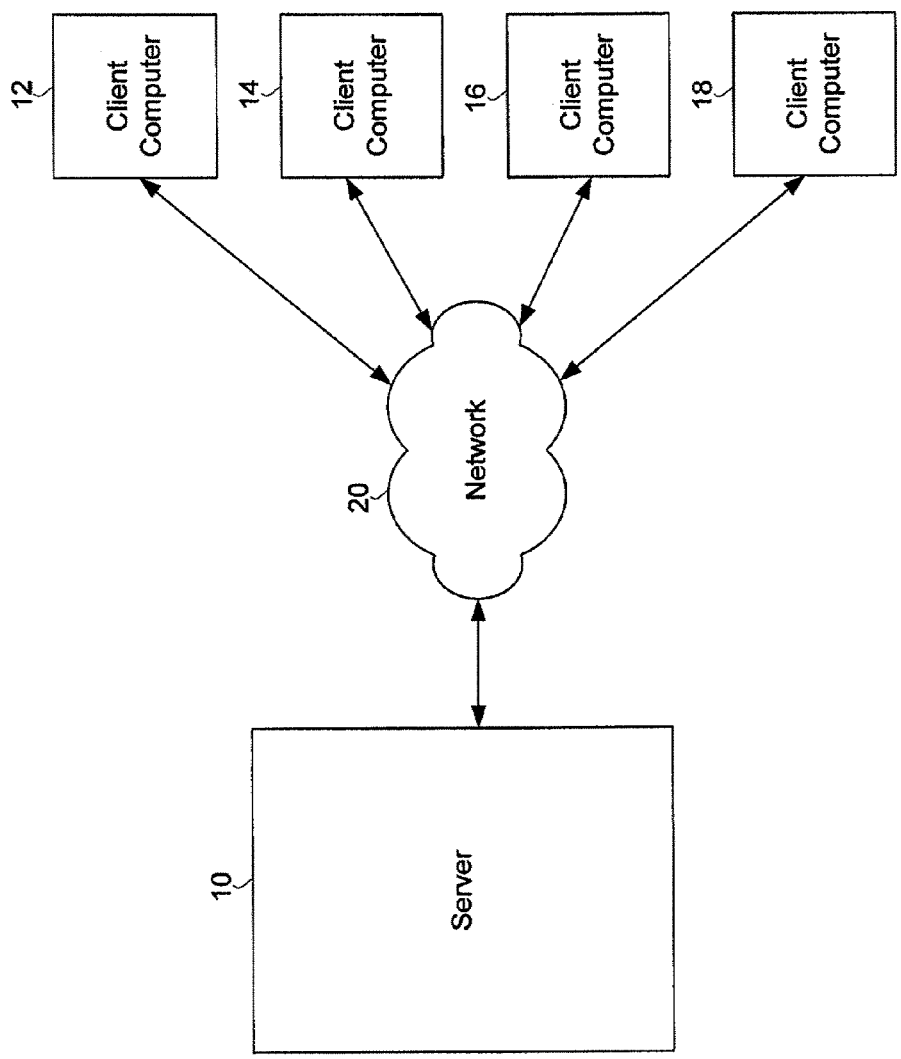
FIG. 1 shows a computer network.
Figure 2:
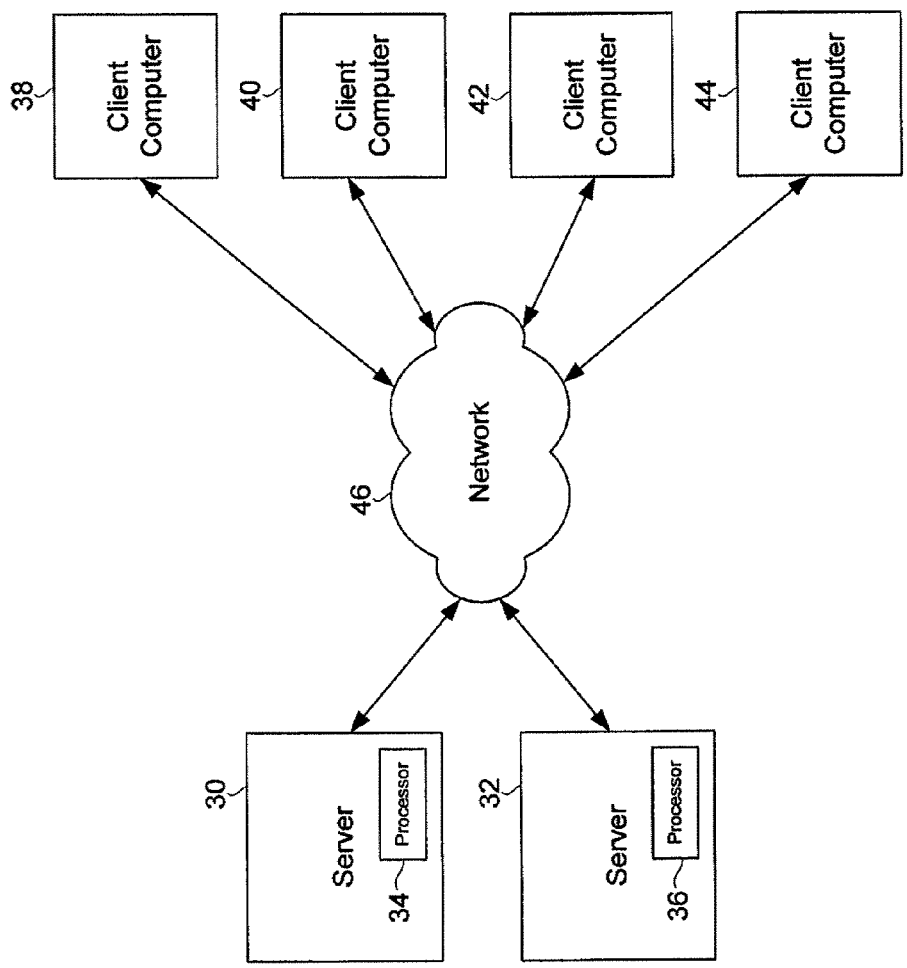
FIG. 2 shows a type of computer network.
Figure 3:
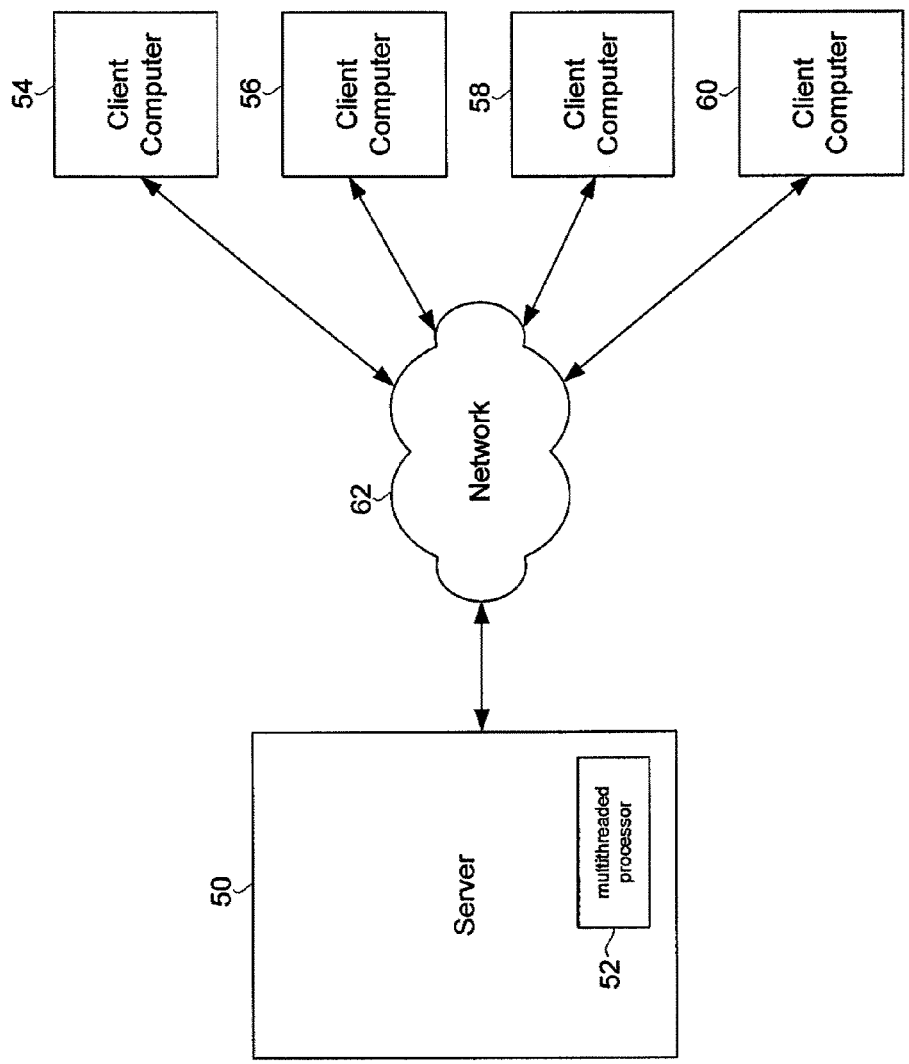
FIG. 3 shows a type of computer network.
Figure 4:
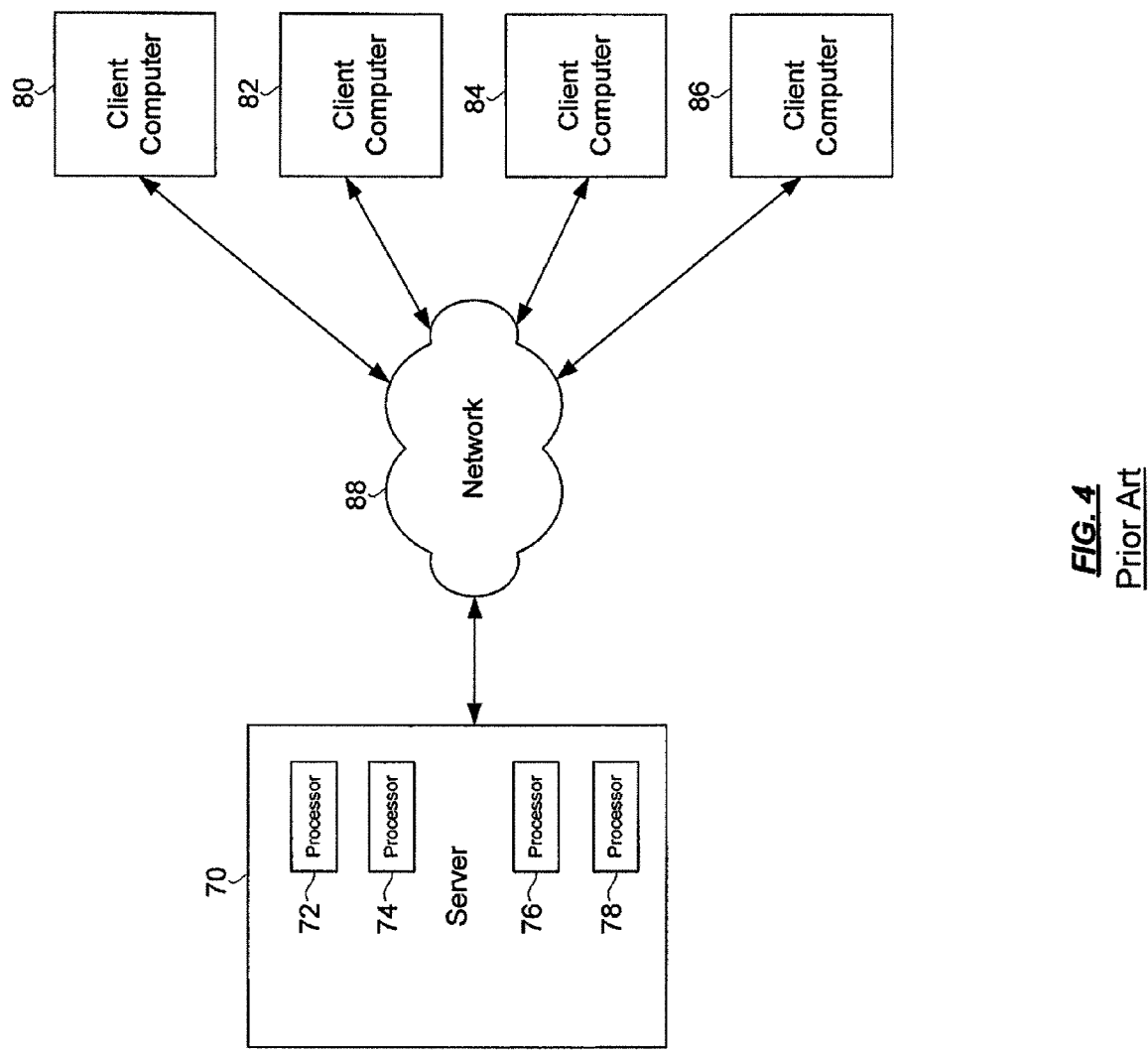
FIG. 4 shows a type of computer network.
Figure 5:
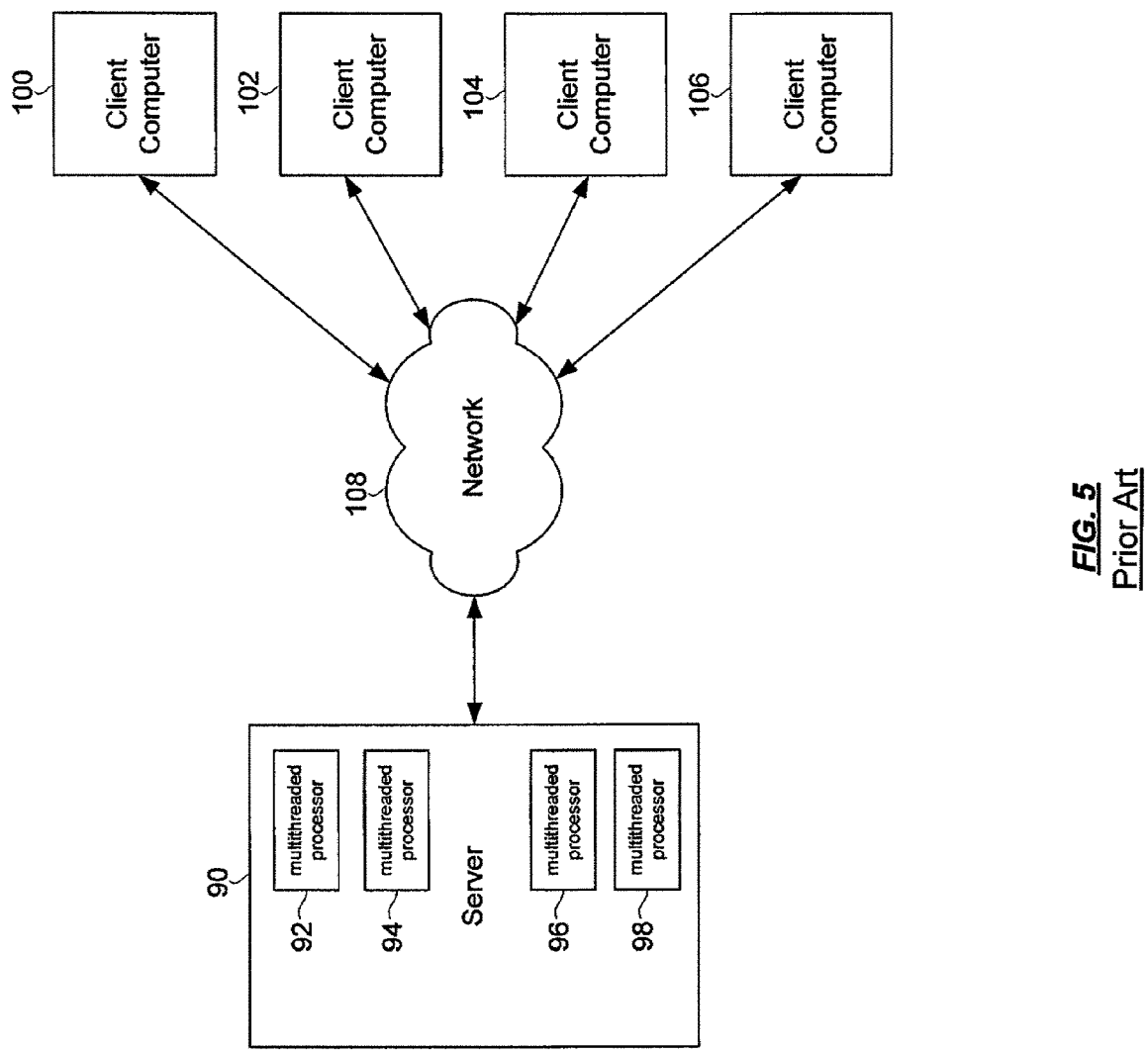
FIG. 5 shows a type of computer network.
Figure 6:
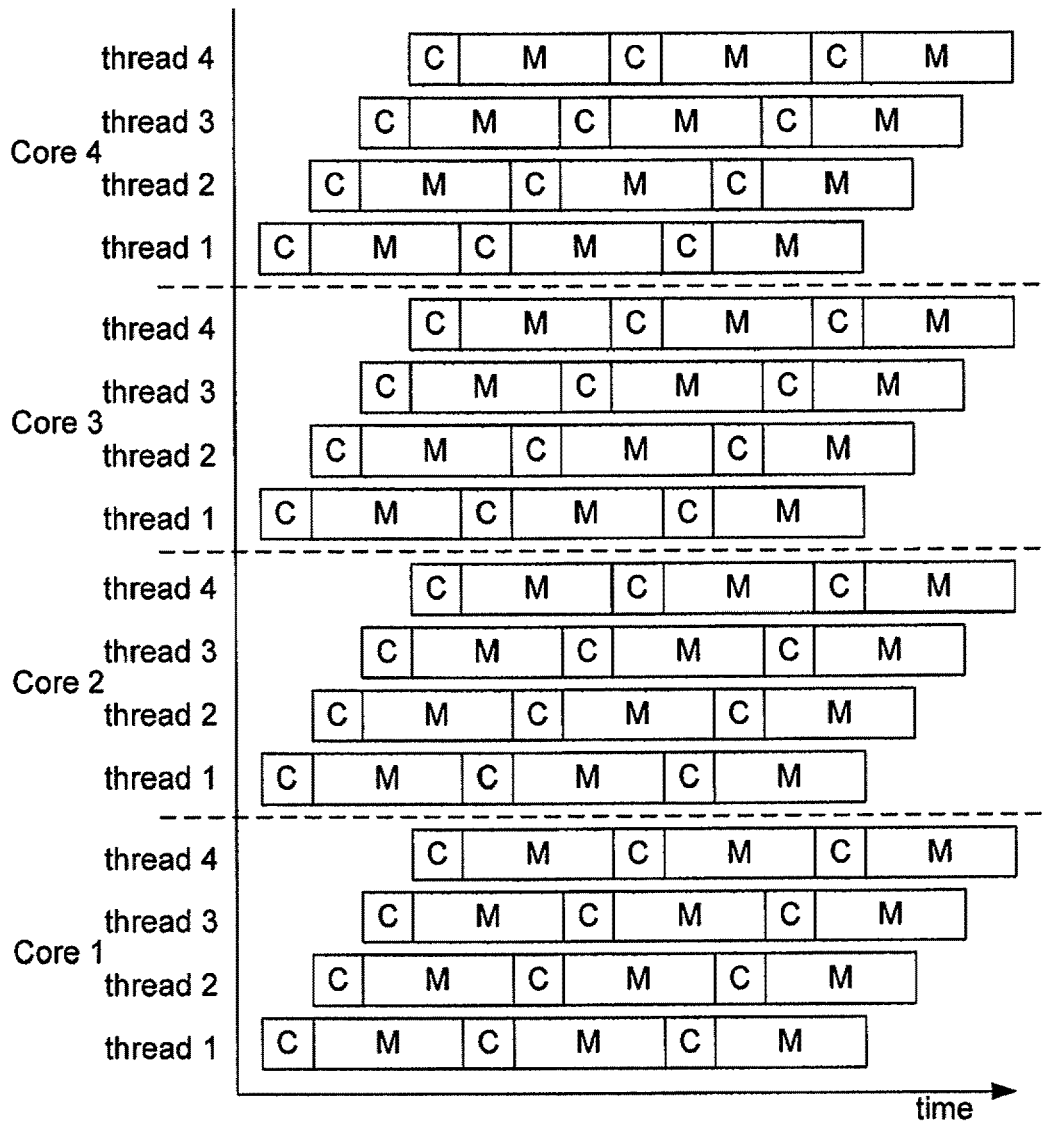
FIG. 6 shows a representation of thread execution in a chip multithreading processor.
Figure 7:
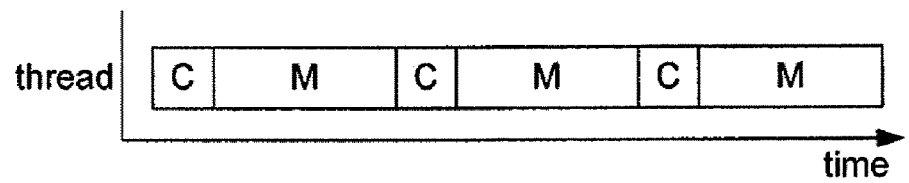
FIG. 7 shows a representation of thread execution in a single-threaded processor.
Figure 8:
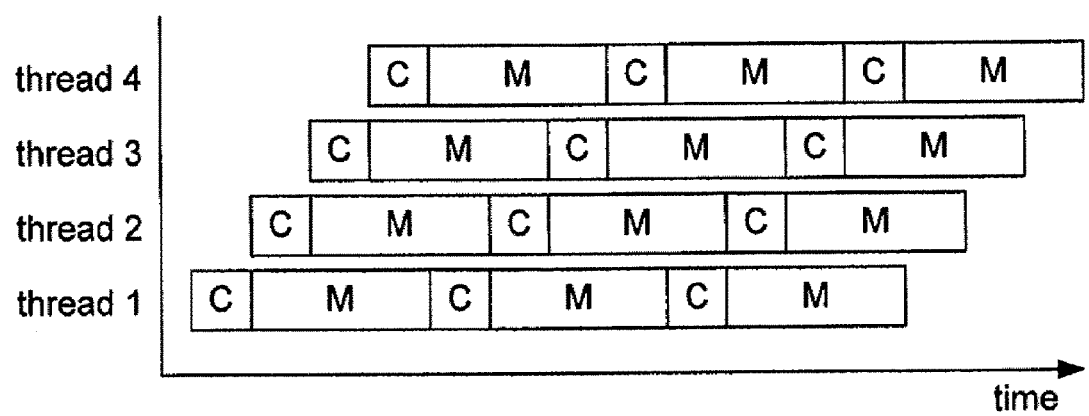
FIG. 8 shows a representation of thread execution in a processor having a single multithreaded processing core.

An exemplary processor in accordance with one or more embodiments of the present invention is formed of a plurality of processing cores, each being configured to execute multiple threads. Such a processor is referred to as a "chip multithreading" processor (or, referred to in the art as being capable of performing "throughout computing"). Thus, a chip multithreading processor has multiple processing cores fabricated on a single piece of silicon, where each processing core is configured to execute multiple threads as shown in FIG. 6 (showing the processing of 16 threads by a single chip multithreading processor versus (i) the processing of one thread in a single-threaded processor as shown in FIG. 7 and (ii) the processing of multiple threads in a processor having a single multithreaded processing core as shown in FIG. 8, where C represents a computing event and M represents a "waiting-on-memory" event).

Those skilled in the art will note that memory speeds have been increasing at a slower rate than processor speeds. Thus, typical processors may be stalled for relatively long times as they wait for data from memory. In a chip multithreading processor, when a thread must wait for a response from memory, the corresponding processing core may start processing another thread. Those skilled in the art will further note that such chip multithreading processors may be useful in thread-rich networking environments.

One factor to be considered in the design of a processor having multiple hardware contexts, such as with a chip multithreading processor, is operating system scheduling. Although a scheduling technique or scheduler design for a processor having a single multithreaded processing core may be applied to assign threads in a chip multithreading processor, one or more embodiments of the present invention relate to an improved scheduling technique (or scheduler) for assigning threads for use of shared hardware resources in a chip multithreading processor.

Figure 9:
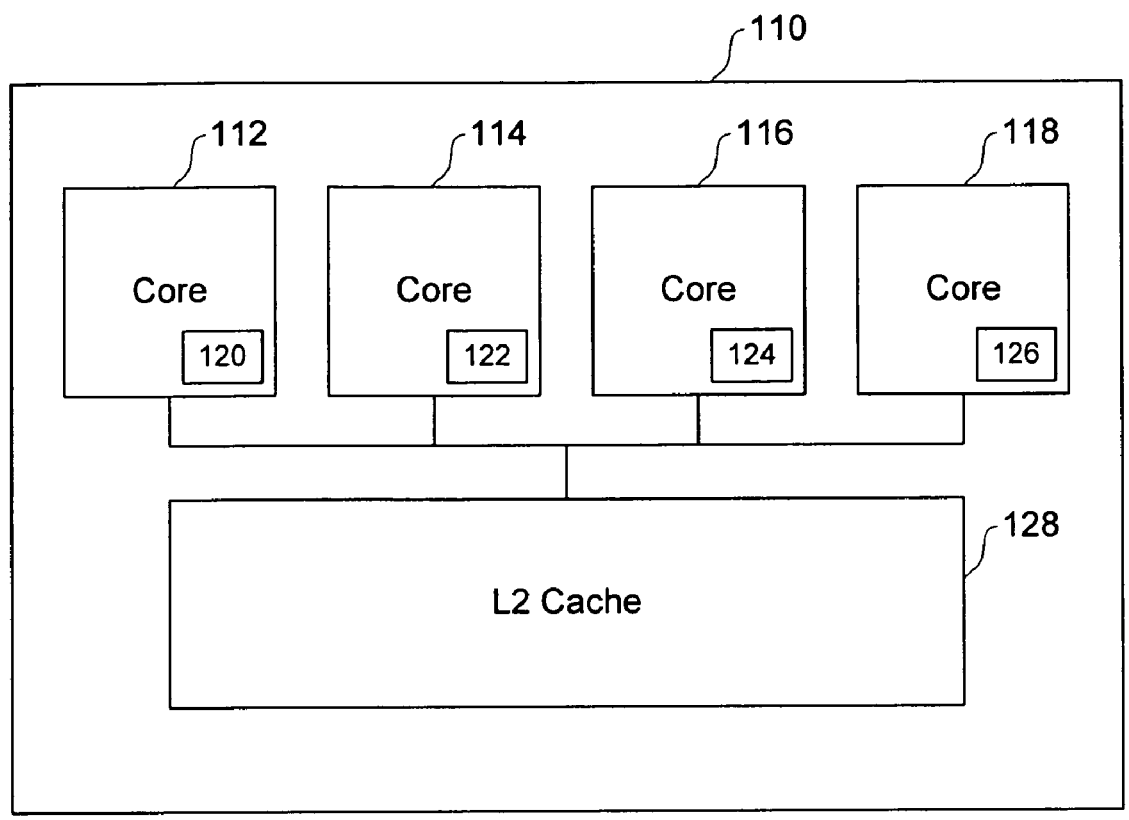
FIG. 9 shows a chip multithreading processor in accordance with an embodiment of the present invention.

FIG. 9 shows an exemplary chip multithreading processor 110 in accordance with an embodiment of the present invention. The chip multithreading processor 110 has processing cores 112, 114, 116, 118, each capable of executing multiple threads as described above. Each processing core 112, 114, 116, 118 has its own local, level 1 ("L1") cache 120, 122, 124, 126, respectively. Further, the chip multithreading processor 110 has a level 2 ("L2") cache 128 that is shared among the processing cores 112, 114, 116, 118.

Because the L2 cache 128 is a shared resource in the chip multithreading processor 110, it is important to schedule threads for use of the L2 cache 128 in a manner that results in improved management of the L2 cache 128. In one or more embodiments of the present invention, an operating system scheduler (not shown) assigns threads based on a determination of which threads collectively achieve a relatively low L2 cache miss rate when run in parallel.

Estimating L2 Cache Miss Rates

In order to assign a group of threads that together achieve a relatively low L2 cache miss rate in a chip multithreading processor, an L2 cache miss rate of each thread in the group is determined. This is achieved by observing/measuring the L2 cache miss rates of executing groups of threads. By recognizing that an observed/measured L2 cache miss rate for an executing group of threads may be expressed as a linear combination of the L2 cache miss rates of the individual threads in the group, one skilled in the art will note that a system of linear equations for one or more executing groups of threads may be used to determine the L2 cache miss rates of individual threads in the one or more executing groups of threads.

Those skilled in the art will note that the use and solving of a system of linear equations as described above may only or mainly be necessary upon system startup when the L2 cache miss rates of individual threads may be largely unknown as they have not yet become part of or are just starting execution in an executing group of threads. Further, in one or more embodiments, an operating system scheduler may give priority to threads that are not yet executing in an attempt to have such threads become part of one or more executing groups of threads for observation/measurement of L2 cache miss rates for the one or more executing groups of threads, thereby leading to a determination of the L2 cache miss rates of the individual threads in the one or more executing groups of threads.

Further, in one or more embodiments of the present invention, when an operating system scheduler has to assign a thread with an unknown L2 cache miss rate, that thread may be co-scheduled with a thread whose L2 cache miss rate is known. Accordingly, a measured L2 cache miss rate of these two threads executing concurrently allows for the determination of the L2 cache miss rate of the thread whose L2 cache miss rate was previously unknown. Moreover, in one or more embodiments of the present invention, assigning a thread having a known L2 cache miss rate with a thread having an unknown L2 cache miss rate may occur to a particular processing core of a chip multithreading processor.

Figure 10:
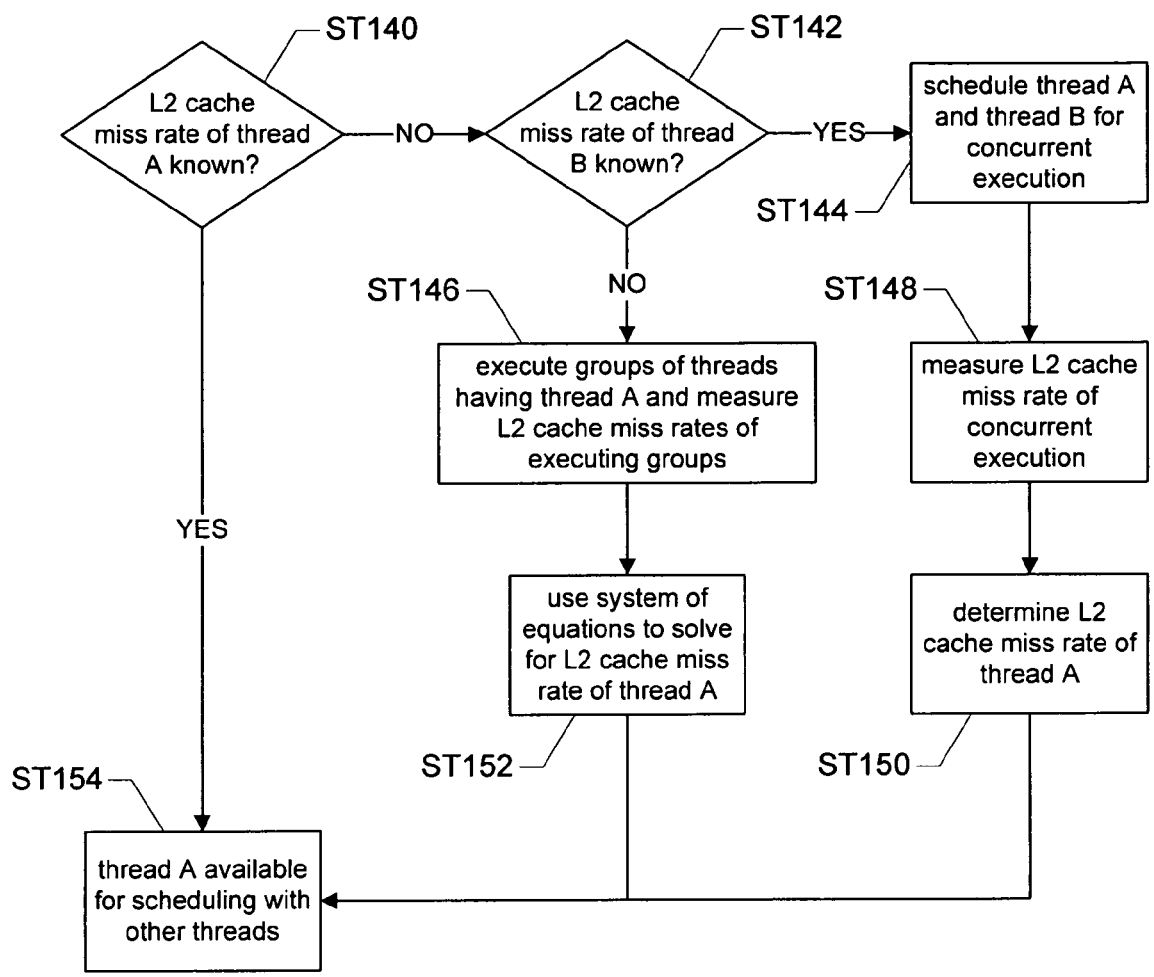
FIG. 10 shows a flow process in accordance with an embodiment of the present invention.

FIG. 10 shows an exemplary flow process in accordance with an embodiment of the present invention. When a thread A becomes available for scheduling, a determination is made as to whether an L2 cache miss rate for thread A is known ST140. If the L2 cache miss rate for thread A is known ST140, then thread A is available for scheduling with other threads ST154 in groups that, for example, achieve a relatively low L2 cache miss as is further described below.

However, if the L2 cache miss rate for thread A is unknown ST140, then a determination is made to whether an L2 cache miss rate for a thread B is known ST142. If the L2 cache miss rate for thread B is known ST142, then thread A and thread B are concurrently executed ST144, during which an L2 cache miss rate of the collective execution is measured ST148. Using the measured L2 cache miss rate in ST148, the L2 cache miss rate of thread A may be determined ST150, whereupon thread A is then available for scheduling with other threads ST154.

If, in step ST142, it is determined that the L2 cache miss rate of thread B is not known, then one or more groups of threads having thread A are executed and the L2 cache miss rates of the executing groups are measured ST146. Using a system of equations ST150 with the measured L2 cache miss rates in ST146, the L2 cache miss rate of thread A may be determined ST152, whereupon thread A is then available for scheduling with other threads ST154.

Those skilled in the art will note that once the L2 cache miss rates of n threads running in a system are determined, the L2 cache miss rate for any arbitrary subset of the n threads may be estimated by averaging the L2 cache miss rates of each of the threads in the subset.

Further, in one or more embodiments of the present invention, the determination of L2 cache miss rates of individual threads running in a system may be periodically or selectively re-measured. For example, if it is discovered that a measured L2 cache miss rate of a particular executing group of threads significantly deviates from an expected L2 cache miss rate for that group, then the L2 cache miss rates for the individual threads in the executing group of threads may be re-measured. Such re-measuring may involve, for example, co-scheduling a thread in the executing group of threads with another thread not part of the executing group of threads and having a known L2 cache miss rate that is not deemed to be in need of re-measuring.

Scheduling

As described above, in one or more embodiments of the present invention, groups of threads collectively having a relatively low L2 cache miss rate are scheduled together for execution. Assignment of a particular group of threads to a particular processing core may be based on a maximum L2 cache miss rate for an individual thread allowed for that particular processing core. Thus, a to-be-assigned thread is assigned to a processing core having the lowest maximum L2 cache miss rate for an individual thread allowed for that processing core that is greater than the L2 cache miss rate of the to-be-assigned thread. For example, if a first processing core has a maximum L2 cache miss rate of 3, and a second processing core has a maximum L2 cache miss rate of 7, then (i) a thread having an L2 cache miss rate of 2 will be assigned to the first processing core, and (ii) a thread having an L2 cache miss rate of 5 cannot be assigned to the first processing core, but can be assigned to the second processing core.

Figure 11:
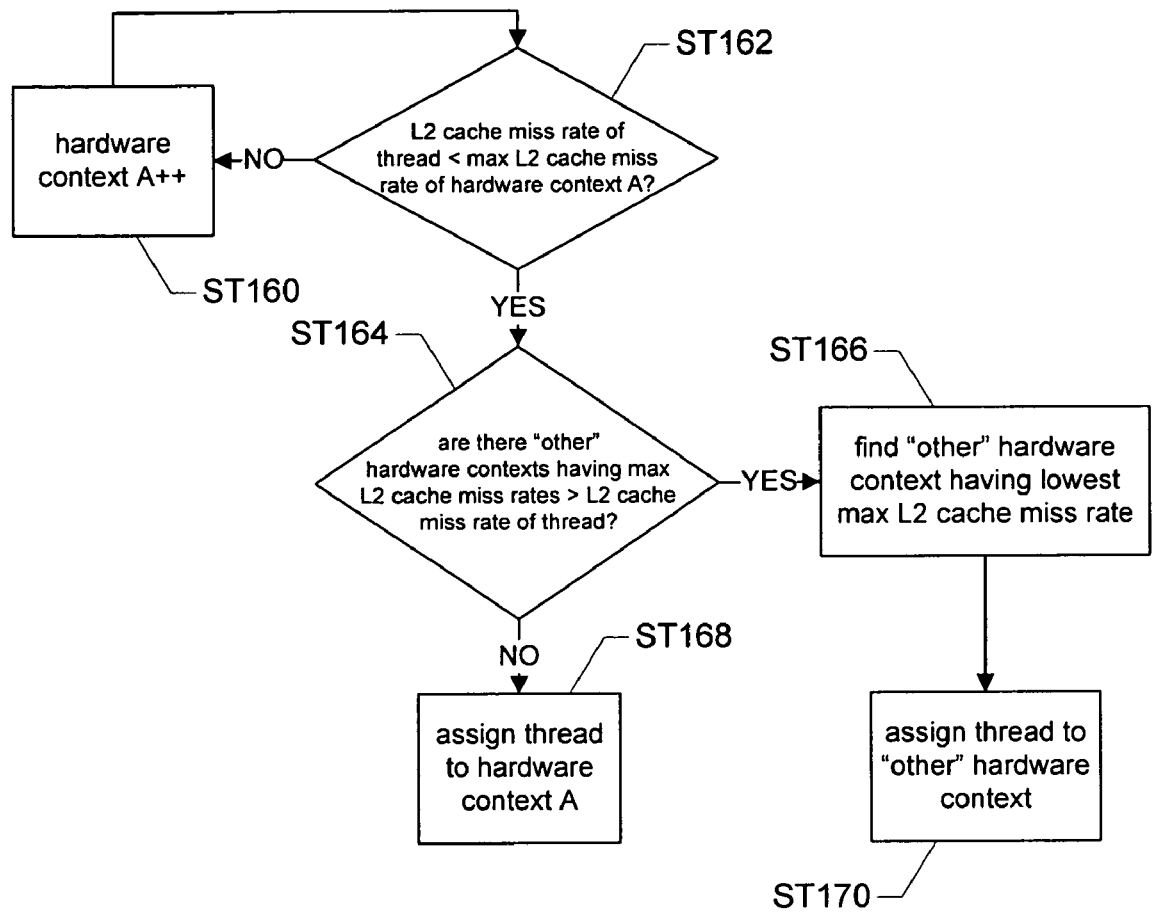
FIG. 11 shows a flow process in accordance with an embodiment of the present invention.

FIG. 11 shows an exemplary flow process in accordance with an embodiment of the present invention. When a thread is being scheduled, a determination is made as to whether an L2 cache miss rate of the thread is less than a maximum L2 cache miss rate value of a processing core A ST162. If the L2 cache miss rate of the thread is not less than the maximum L2 cache miss rate value of the processing core A ST162, then an L2 cache miss rate of a next processing core A is compared against the L2 cache miss rate of the thread ST160, ST162.

If the L2 cache miss rate of the thread is less than a maximum L2 cache miss rate value of a processing core A ST162, then a determination is to made as to whether there are "other" processing cores that have maximum L2 cache miss rate values greater than the L2 cache miss rate of the thread ST164. If there are no such "other" processing cores, then the thread is assigned to processing core A ST168. Otherwise, the "other" processing core having the lowest maximum L2 cache miss rate value greater than the L2 cache miss rate of the thread is found ST166, whereupon the thread is then assigned to that "other" processing core ST170.

Figure 12:
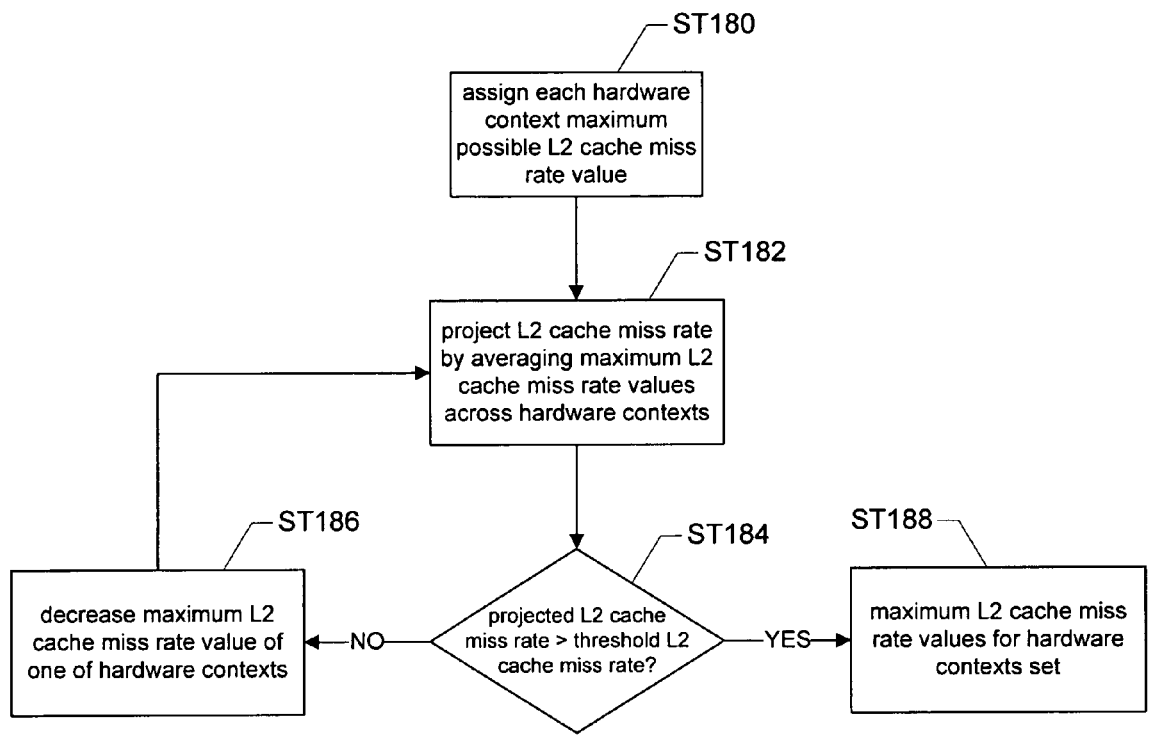
FIG. 12 shows a flow process in accordance with an embodiment of the present invention.

Assigning a maximum L2 cache miss rate value to a processing core may be achieved in one of various ways. FIG. 12 shows an exemplary flow process for assigning maximum L2 cache miss rate values to processing cores in a chip multithreading processing in accordance with an embodiment of the present invention. In FIG. 12, each processing core in a chip multithreading processor is first assigned its maximum possible L2 cache miss rate value ST180. Then, a projected L2 cache miss rate is computed by averaging the maximum L2 cache miss rate values across the processing cores ST182. If the projected L2 cache miss rate is higher than a threshold L2 cache miss rate ST184, the maximum L2 cache miss rate value of one of the processing cores is decreased ST186, whereupon ST182 is repeated. Once and if the projected L2 cache miss rate is less than or equal to the threshold L2 cache miss rate ST184, the maximum L2 cache miss rate values of the processing cores may be considered set ST188.

Those skilled in the art will note that in one or more embodiments of the present invention, the threshold L2 cache miss rate may be selected so as to effectuate a desired behavior or performance level. In one or more embodiments of the present invention, should the flow process shown in FIG. 12 fail to bring the projected L2 cache miss rate to be less than or equal to the threshold L2 cache miss rate, the flow process may be caused to terminate.

In one or more embodiments of the present invention, a processing core that has its maximum L2 cache miss rate value decreased (e.g., in ST184 of FIG. 12) may be selected such that decreasing its maximum L2 cache miss rate value results in the least amount of threads being restricted from being assigned.

Those skilled in the art will note that by ensuring that a thread can be only assigned to particular processing cores in a chip multithreading processor, the assignment of "cache-greedy" threads (i.e., threads having relatively high L2 cache miss rates, thereby having poor "cache locality") may be restricted to one or only a few of all the processing cores. Thus, in general, the overall L2 cache miss rate for a system having n threads is reduced as "cache-greedy" threads of the n threads are not allowed to "clog" up numerous processing cores. In other words, by ensuring that "cache-greedy" threads are assigned to only one or a few of all processing cores in a chip multithreading processor, long latency times associated with such "cache-greedy" threads may be avoided in most of the processing cores.

Advantages of the present invention may include one or more of the following. In one or more embodiments of the present invention, a chip multithreading processor may assign threads for execution in a manner that improvedly uses a shared cache of the chip multithreading processor.

In one or more embodiments of the present invention, a chip multithreading processor may schedule threads such that cache-greedy threads are not allowed to cause long latency events in any one of the processing cores of the chip multithreading processor.

In one or more embodiments of the present invention, by scheduling threads of a chip multithreading processor dependent on their cache miss rates, an overall cache miss rate of the chip multithreading processor may be reduced.

In one or more embodiments of the present invention, a determination of cache miss rates of one or more threads may be determined without significant effect on the performance of a chip multithreading processor employing the one or more threads.

In one or more embodiments of the present invention, a scheduler of a chip multithreading processor may achieve reduced contention of a shared hardware resource (e.g., an L2 cache) of the chip multithreading processor.

In one or more embodiments of the present invention, by scheduling threads of a chip multithreading processor dependent on their L2 cache miss rates, instruction throughput may be increased.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of performing computer system operations, comprising:
   obtaining a first thread associated with a first cache miss rate;
   obtaining a second thread associated with a second cache miss rate;
   measuring a first shared cache miss rate of the first thread and the second thread by concurrently executing the first thread and the second thread, wherein the first shared cache miss rate is a function of the first cache miss rate and the second cache miss rate;
   estimating the first cache miss rate from the first shared cache miss rate, wherein a value of the first cache miss rate is unknown prior to measuring the first shared cache miss rate;
   identifying a plurality of processing cores, wherein each of the plurality of processing cores is associated with one of a plurality of maximum cache miss rates, and wherein each of the plurality of maximum cache miss rates is not less than the first cache miss rate;
   identifying a lowest maximum cache miss rate of the plurality of maximum cache miss rates;
   selecting a processing core of the plurality of processing cores associated with the lowest maximum cache miss rate; and
   assigning the first thread to the processing core.

2. The method of claim 1, wherein the second cache miss rate is known prior to measuring the first shared cache miss rate.

3. The method of claim 1, further comprising:
   measuring a second shared cache miss rate of the first thread and the second thread by concurrently executing the first thread and the second thread, wherein the second shared cache miss rate is a function of the first cache miss rate and the second cache miss rate; and
   estimating the first cache miss rate from the second shared cache miss rate.

4. The method of claim 1, wherein estimating the first cache miss rate occurs dynamically upon start-up of the plurality of processing cores.

5. The method of claim 1, wherein estimating the first cache rate comprises:
   solving a linear system of equations using the first shared cache miss rate and the second cache miss rate, wherein the value of the first cache miss rate is a variable of the linear system.

6. A computer system, comprising:
   an integrated circuit having a first plurality of processing cores formed therein;
   a cache memory shared by the first plurality of processing cores; and
   memory having instructions for assigning a first thread with a first cache miss rate to one of the first plurality of processing cores, the instructions comprising functionality to:
      obtain a second thread associated with a second cache miss rate;
      measure a first shared cache miss rate of the first thread and the second thread by concurrently executing the first thread and the second thread, wherein the first shared cache miss rate is a function of the first cache miss rate and the second cache miss rate;
      estimate the first cache miss rate from the first shared cache miss rate, wherein a value of the first cache miss rate is unknown prior to measuring first the shared cache miss rate;
      identify a second plurality of processing cores from the first plurality of processing cores, wherein each of the second plurality of processing cores is associated with one of a plurality of maximum cache miss rates, and wherein each of the plurality of maximum cache miss rates is not less than the first cache miss rate;
      identify a lowest maximum cache miss rate of the plurality of maximum cache miss rates;
      select a processing core of the second plurality of processing cores associated with the lowest maximum cache miss rate; and
      assign the first thread to the processing core.

7. The computer system of claim 6, wherein the second cache miss rate is known prior to measuring the first shared cache miss rate.

8. The computer system of claim 6, wherein the instructions to estimate the first cache rate comprise functionality to:
   solve a linear system of equations using the first shared cache miss rate and the second cache miss rate, wherein the value of the first cache miss rate is a variable of the linear system.

9. The computer system of claim 6, the instructions further comprising functionality to:
   measure a second shared cache miss rate of the first thread and the second thread by concurrently executing the first thread and the second thread, wherein the second shared cache miss rate is a function of the first cache miss rate and the second cache miss rate; and
   estimate the first cache miss rate from the second shared cache miss rate.

10. The computer system of claim 6, wherein the instructions to estimate the first cache miss rate occur dynamically upon start-up of the integrated circuit.

11. An apparatus, comprising:
    an integrated circuit;
    means on the integrated circuit for obtaining a first thread associated with a first cache miss rate;
    means on the integrated circuit for obtaining a second thread associated with a second cache miss rate;
    means on the integrated circuit for measuring a first shared cache miss rate of the first thread and the second thread by concurrently executing the first thread and the second thread, wherein the first shared cache miss rate is a function of the first cache miss rate and the second cache miss rate;
    means on the integrated circuit for estimating the first cache miss rate from the first shared cache miss rate, wherein a value of the first cache miss rate is unknown prior to measuring first the first shared cache miss rate;
    means on the integrated circuit for identifying a plurality of processing cores, wherein each of the plurality of processing cores is associated with one of a plurality of maximum cache miss rates, and wherein each of the plurality of maximum cache miss rates is not less than the first cache miss rate;

means on the integrated circuit for identifying a lowest maximum cache miss rate of the plurality of maximum cache miss rates;

means on the integrated circuit for selecting a processing core of the plurality of processing cores associated with the lowest maximum cache miss rate; and means on the integrated circuit for assigning the first thread to the processing core.

12. The apparatus of claim 11, further comprising:

means on the integrated circuit for measuring a second shared cache miss rate of the first thread and the second thread by concurrently executing the first thread and the second thread, wherein the second shared cache miss rate is a function of the first cache miss rate and the second cache miss rate; and means on the integrated circuit for estimating the first cache miss rate from the second shared cache miss rate.

* * * * *